(12) United States Patent
Breton et al.

(10) Patent No.: US 11,198,925 B2
(45) Date of Patent: Dec. 14, 2021

(54) ALUMINUM ALLOYS HAVING IMPROVED TENSILE PROPERTIES

(71) Applicant: Rio Tinto Alcan International Limited, Montreal (CA)

(72) Inventors: Francis Breton, Saguenay (CA);
Bruno Bourassa, Jonquière (CA);
Alexandre Maltais, Chicoutimi (CA);
Clément Boudreault, Jonquière (CA);
Dany Tremblay, La-Rouche (CA)

(73) Assignee: Rio Tinto Alcan International Limited, Montreal (CA)

( * ) Notice: Subject to any disclaimer, the term of this patent is extended or adjusted under 35 U.S.C. 154(b) by 146 days.

(21) Appl. No.: 16/087,832

(22) PCT Filed: Mar. 10, 2017

(86) PCT No.: PCT/CA2017/050323
§ 371 (c)(1),
(2) Date: Sep. 24, 2018

(87) PCT Pub. No.: WO2017/165962
PCT Pub. Date: Oct. 5, 2017

(65) Prior Publication Data
US 2019/0136349 A1    May 9, 2019

Related U.S. Application Data

(60) Provisional application No. 62/315,798, filed on Mar. 31, 2016.

(51) Int. Cl.
*C22C 21/04*    (2006.01)
*B22D 21/00*    (2006.01)
(Continued)

(52) U.S. Cl.
CPC ............ *C22C 21/04* (2013.01); *B22D 21/007* (2013.01); *C22C 1/00* (2013.01); *C22C 21/02* (2013.01);
(Continued)

(58) Field of Classification Search
None
See application file for complete search history.

(56) References Cited

U.S. PATENT DOCUMENTS 6,267,829 B1    7/2001    Backerud et al.
2002/0155023 A1    10/2002    Barresi et al.
(Continued)

FOREIGN PATENT DOCUMENTS

CN    102936675 A    2/2013
CN    104630578 A *   5/2015
(Continued)

OTHER PUBLICATIONS

Jul. 1, 2019—(EP) Office Action—App 17772897.9.
(Continued)

*Primary Examiner* — Anthony M Liang
(74) *Attorney, Agent, or Firm* — Banner & Witcoff, Ltd.

(57) ABSTRACT

The present disclosure provides Al—Si—Mg aluminum alloys comprising a deliberate addition of Mn between 0.05-0.40 weight percent to increase at least one tensile property (such as the yield strength) of an aluminum product comprising such alloy. The Al—Si—Mg alloy comprises, in weight percent, 5-9% Si, 0.35-0.75% Mg, 0.05-0.4% Mn, less than 0.15% Fe, up to 0.15% Ti, 0.005-0.03% Sr and the balance being aluminum and unavoidable impurities, wherein the unavoidable impurities may be present in an amount of up to 0.05% each and up to 0.15% total. The present disclosure provides a foundry ingot comprising the above Al—Si—Mg aluminum alloy, a process for making
(Continued)

the above Al—Si—Mg aluminum alloy and an aluminum alloy obtainable by said process.

10 Claims, 8 Drawing Sheets

(51) Int. Cl.
  *C22F 1/043* (2006.01)
  *C22C 21/02* (2006.01)
  *C22C 1/00* (2006.01)
  *B60B 3/00* (2006.01)

(52) U.S. Cl.
  CPC ............... *C22F 1/043* (2013.01); *B60B 3/00* (2013.01); *B60B 2310/202* (2013.01); *B60B 2310/204* (2013.01); *B60B 2360/104* (2013.01)

(56) References Cited

U.S. PATENT DOCUMENTS

2004/0011437 A1  1/2004  Lin et al.
2009/0297393 A1  12/2009  Wust et al.
2016/0355908 A1* 12/2016  Yoshida ............. B22D 17/2007

FOREIGN PATENT DOCUMENTS

DE  102008046803 A1  3/2010
EP      2471967 A1  7/2012
GN      104630578 A  5/2015
WO    2010086951 A1  8/2010
WO    2015151369 A1  10/2015

OTHER PUBLICATIONS

International Search Report and Written Opinion for PCT/CA2017/050323 dated Jun. 15, 2017.
Abstract of "Methods for the Improvement of Ductility in an E357 Aluminum Alloy" by David Weiss.
Pourbahari and Emamy, Effects of La intermetallics on the structure and tensile properties of thin section gravity die-cast A357 Al alloy, Materials and Design 94 (2016) 111-120.
Kaufman J.G., Rooy E.L., "Aluminum Alloy Castings: Properties, Processes, and Applications", American Foundry Society, ASM International, 2004.
Zhang et cl., "Microstructure and Mechanical Properties of AlSi10Mg Permanent Mould and High Pressure Vacuum Die Castings", article, 11 pages; published in the Proceedings of the 16th International Aluminum Alloys Conference, 2018, ISBN: 978-1-926872-41-4, by the Canadian Institute of Mining, Metallurgy & Petroleum, located online 2018.

* cited by examiner

ALUMINUM ALLOYS HAVING IMPROVED TENSILE PROPERTIES

CROSS-REFERENCE TO RELATED APPLICATIONS

The present application is a U.S. National Phase filing of International Application No. PCT/CA2017/050323, filed on Mar. 10, 2017, and claiming priority to U.S. Patent Application No. 62/315,798 filed Mar. 31, 2016. The present application claims priority to and the benefit of all the above-identified applications, which are all incorporated by reference herein in their entireties.

TECHNOLOGICAL FIELD

This application relates to the use of manganese (Mn), optionally in combination with lanthanum (La), for improving the tensile properties of aluminum products comprising an Al—Si—Mg aluminum alloy having a high magnesium (Mg) content. In some embodiments, the aluminum products are cast aluminum product which can be obtained, for example, with permanent mold casting.

BACKGROUND

Al—Si—Mg alloys are a group of heat treatable cast Al—Si alloys which are used in structural applications (automotive, aerospace, general engineering) because they exhibit excellent casting characteristics, good corrosion resistance, welding, excellent mechanical properties and a high strength-to-weight ratio in heat treated conditions.

In order to increase the strength properties of an aluminum product comprising an Al—Si—Mg aluminum alloy, it is possible to increase the weight percent of Mg. However, such increase in Mg content can be associated with microstructurel defects and a decrease in one or more tensile properties.

It would be highly desirable to be provided with an Al—Si—Mg aluminum alloy having a high Mg content while maintaining or increasing at least one of its tensile properties.

BRIEF SUMMARY

The present disclosure relates to the use of Mn to increase at least one tensile properties of a product comprising an aluminum alloy (for example from an Al—Si—Mg aluminum alloy) comprising a high Mg content. Optionally, La can be used in combination with Mn to refine the grain size of the aluminum alloy. The aluminum product can be a cast aluminum product and in some embodiment, a cast aluminum product obtained by permanent mold casting.

In a first aspect, the present disclosure provides An aluminum alloy comprising, in weight percent: between about 5 and about 9 of Si, between about 0.35 and about 0.75 of Mg, between higher than about 0.05 and equal to and lower than about 0.4 of Mn, lower than about 0.15 of Fe, up to about 0.15 of Ti, between about 0.005 to about 0.03 of Sr and the balance being aluminum and unavoidable impurities, wherein the unavoidable impurities may be present in an amount of up to 0.05 each and up to 0.15 total. In an embodiment, the weight percent of Si is between about 6 and about 8. In another embodiment, the weight percent of Mg is between about 0.45 and about 0.60. In still another embodiment, the weight percent of Mn is between 0.15 and about 0.30. In a further embodiment, the weight percent of Fe is lower than about 0.12. In another embodiment, the weight percent of Fe is at least about 0.1. In still a further embodiment, the weight percent of Ti is at least about 0.06. In another embodiment, the weight percent of Sr is between about 0.005 and about 0.02. In yet another embodiment, the aluminum alloy further comprises La at a weight percent equal to or lower than about 0.2. In still another embodiment, the aluminum alloy further comprises Cr at a weight percent of up to 0.25. In yet another embodiment, the aluminum alloy does not include Co as a deliberate addition.

In a second aspect, the present disclosure provides a foundry ingot comprising the aluminum alloy described herein.

In a third aspect, the present disclosure provides a process for improving at least one tensile property of an aluminum product comprising a modified aluminum alloy when compared to a corresponding aluminum product comprising a first aluminum alloy. Broadly, the process comprises combining Mn with the first aluminum alloy to provide the modified aluminum alloy. The first aluminum alloy comprises, in weight percent, between about 5 and about 9 of Si; between about 0.35 and about 0.75 of Mg; lower than about 0.15 of Fe; up to about 0.15 of Ti; between about 0.005 to about 0.03 of Sr; and the balance being aluminum and unavoidable impurities, wherein the unavoidable impurities may be present in an amount of up to 0.05 each and up to 0.15 total. Further, in the modified aluminum alloy, the weight percent of Mn is between higher than about 0.05 and equal to and lower than about 0.4. In an embodiment, the improved tensile property is yield strength. In another embodiment, the weight percent of Si (in the first aluminum alloy and/or the modified aluminum alloy) is between about 6 and about 8. In still another embodiment, the weight percent of Mg (in the first aluminum alloy and/or the modified aluminum alloy) is between about 0.45 and about 0.60. In yet another embodiment, the weight percent of Mn (in the modified aluminum alloy) is between about 0.15 and about 0.30. In still another embodiment, the weight percent of Fe (in the first aluminum alloy and/or the modified aluminum alloy) is lower than about 0.12. In yet another embodiment, the weight percent of Fe (in the first aluminum alloy and/or the modified aluminum alloy) is at least about 0.1. In a further embodiment, the weight percent of Ti (in the first aluminum alloy and/or the modified aluminum alloy) is at least about 0.06. In still another embodiment, the weight percent of Sr (in the first aluminum alloy and/or the modified aluminum alloy) is between about 0.008 and about 0.02. In still yet another embodiment, the process further comprises adding La in the first aluminum alloy or the modified aluminum alloy at a weight percent equal to or lower than about 0.2. In yet another embodiment, the process further comprises adding Cr in the first aluminum alloy of the modified aluminum alloy at a weight percent of up to about 0.25. In an embodiment, the process does not include (deliberatively) adding Co in the first aluminum alloy or the modified aluminum alloy. In still another embodiment, the aluminum product is a cast product (such as, for example, a wheel) and the process further comprises casting the modified aluminum alloy in the aluminum product. In still another embodiment, casting is a permanent mold casting. In yet another embodiment, the cast product has a thickness of at least about 6 mm.

According to a fourth aspect, the present disclosure provides an aluminum product obtainable or obtained by the process described herein.

According to a fifth aspect, the present disclosure provides a process for making an aluminum product having an improved tensile property. Broadly, the process comprises working the aluminum alloy described herein or the foundry ingot described herein in the aluminum product. In an embodiment, the aluminum product is a cast product (such as, for example, a wheel) and the process further comprises casting the aluminum alloy into the cast product. In still another embodiment, casting is a permanent mold casting. In an embodiment, the cast product has a thickness of at least about 6 mm.

According to a sixth aspect, the present disclosure provides an aluminum product obtainable or obtained by the process described herein.

BRIEF DESCRIPTION OF THE DRAWINGS

Having thus generally described the nature of the invention, reference will now be made to the accompanying drawings, showing by way of illustration, a preferred embodiment thereof, and in which.

DETAILED DESCRIPTION

Figure 1:
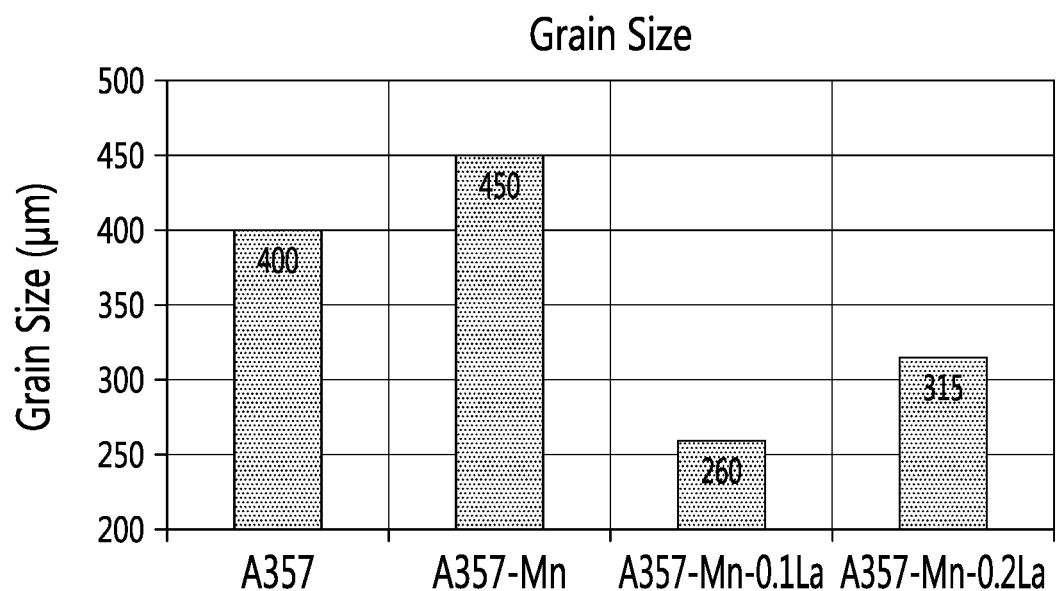
FIG. 1 illustrates the effect of the chemistry of the different alloys on grain size. Results are shown as grain size (in μm) in function of the different alloys tested.

The present disclosure relates to the use of Mn as a deliberate addition to Al—Si—Mg foundry alloys to improve at least one tensile property (such as, for example yield strength). In some embodiments, the addition of Mn increases the yield strength of a resulting cast product comprising the aluminum alloy. Consequently, the Mn can be used to generate castable aluminum alloys (such as low pressure castable aluminum alloys) allowing mass reduction of the final cast product. The aluminum alloy of the present disclosure is especially useful for making cast products using a permanent mold.

The present disclosure provides aluminum alloys comprising a deliberation addition of manganese (Mn) to improve one or more tensile properties of an aluminum product comprising such aluminum alloy. In an embodiment, the aluminum alloys of the present disclosure have, as major alloying elements (besides Mn) Si and Mg. Such aluminum alloys are referred to as Al—Si—Mg alloys.

The aluminum alloys of the present disclosure is a foundry alloy for casting ingots. The aluminum alloy of the present disclosure are cast alloys for casting operations (such as, for example, permanent mold casting operations). Exemplary cast alloys include, 3xx series alloys (such as, for example, 356 alloys (including A356.2 alloys) and 357 alloys (including A357 alloys)).

The aluminum alloy of the present disclosure comprises silicon (Si). Si is important for improving or maintaining the fluidity of the alloy. When Si is provided at a weight percent below 5 (in weight percentage of the aluminum alloy), the resulting aluminum alloy does not have the fluidity required for some downstream operation (such as casting for example). As such, in an embodiment, the weight percent of Si in the aluminum alloy is equal to or higher than about 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, 8, 8.1, 8.2, 8.3, 8.4, 8.5, 8.6, 8.7, 8.8 or 8.9. The weight percent of Si in the aluminum alloy can be between about a value equal to or higher than about 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, 8, 8.1, 8.2, 8.3, 8.4, 8.5, 8.6, 8.7, 8.8 or 8.9 and a value equal to or lower than about 9, 8.9, 8.8., 8.7, 8.6, 8.5, 8.4, 8.3, 8.2, 8.1, 8, 7.9, 7.8, 7.7, 7.6, 7.5, 7.4, 7.3, 7.2, 7.1, 7, 6.9, 6.8, 6.7, 6.6, 6.5, 6.4, 6.3, 6.2, 6.1, 6, 5.9, 5.8, 5.7, 5.6, 5.5, 5.4, 5.3, 5.2 or 5.1. In addition, the aluminum alloy can have a weight percent of Si between a value equal to or higher than about 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, 8, 8.1, 8.2, 8.3, 8.4, 8.5, 8.6, 8.7, 8.8 or 8.9 and a value of about 9. In addition, the weight percent of Si in the aluminum alloy can be between about 5 and a value equal to or lower than about 9, 8.9, 8.8., 8.7, 8.6, 8.5, 8.4, 8.3, 8.2, 8.1, 8, 7.9, 7.8, 7.7, 7.6, 7.5, 7.4, 7.3, 7.2, 7.1, 7, 6.9, 6.8, 6.7, 6.6, 6.5, 6.4, 6.3, 6.2, 6.1, 5.9, 5.8, 5.7, 5.6, 5.5, 5.4, 5.3, 5.2 or 5.1. In an embodiment, the aluminum alloy has a weight percent of Si between about 6 and about 8 and, in a further embodiment, the aluminum alloy has a weight percent of Si of about 7.

The aluminum alloy of the present disclosure comprises magnesium (Mg). As an alloying element, magnesium provides strength to a product comprising same. However, when the weight percent of Mg is equal to or above about 0.35, a decrease in at least one tensile property and/or microstructurel defects are observed. The decrease in tensile properties and defects in microstructures are not observed when the weight percent of Mg is below about 0.35. As such, in an embodiment, the aluminum alloy can have a weight percent of Mg equal to or higher than about 0.35, 0.36, 0.37, 0.38, 0.39, 0.40, 0.41, 0.42, 0.43, 0.044, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73 or 0.74. Further, the aluminum alloy can have a weight percent of Mg between a value equal to or higher than about 0.35, 0.36, 0.37, 0.38, 0.39, 0.40, 0.41, 0.42, 0.43, 0.044, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73 or 0.74 and a value equal to or lower than 0.75, 0.74, 0.73, 0.72, 0.71, 0.70, 0.69, 0.68, 0.67, 0.66, 0.65, 0.64, 0.63, 0.62, 0.61, 0.60, 0.59, 0.58, 0.57, 0.56, 0.55, 0.54, 0.53, 0.52, 0.51, 0.50, 0.49, 0.48, 0.47, 0.46, 0.45, 0.44, 0.43, 0.42, 0.41, 0.40, 0.39, 0.38, 0.37 or 0.36. In addition, the aluminum alloy can have a weight percent of Mg between a value equal to or higher than about 0.35, 0.36, 0.37, 0.38, 0.39, 0.40, 0.41, 0.42, 0.43, 0.044, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73 or 0.74 and a value of about 0.75. Also, the aluminum alloy can have a weight percent of Mg between about 0.35 and a value equal to or lower than 0.75, 0.74, 0.73, 0.72, 0.71, 0.70, 0.69, 0.68, 0.67, 0.66, 0.65, 0.64, 0.63, 0.62, 0.61, 0.60, 0.59, 0.58, 0.57, 0.56, 0.55, 0.54, 0.53, 0.52, 0.51, 0.50, 0.49, 0.48, 0.47, 0.46, 0.45, 0.44, 0.43, 0.42, 0.41, 0.40, 0.39, 0.38, 0.37 or 0.36. In an embodiment, the weight percent of Mg in the aluminum alloy is between about 0.35 and about 0.75, and in a further embodiment, between 0.45 and about 0.60. In yet another embodiment, the weight percent of Mg in the aluminum alloy can be between 0.50 and 0.60.

Iron (Fe) is present in the alloy most likely due to the alumina electrolysis process used to generate the aluminum. In the aluminum alloys of the present disclosure, Fe can be present at a weight percent of up to 0.15. In embodiments, the weight percent of Fe in the aluminum alloy is lower than 0.15. For example, the weight percent of Fe in the aluminum alloys of the present disclosure is equal to or lower than 0.14, 0.13, 0.12, 0.11, 0.1, 0.09, 0.08, 0.07, 0.06 or 0.05. In still another embodiment, the weight percent of Fe in the aluminum alloys of the present disclosure is equal to or lower than 0.12. In some embodiments, Fe is present at a weight percent equal to or higher than (of at least) 0.1.

Titanium (Ti) can be included in the aluminum alloy of the present disclosure as a grain refiner. For example, the weight percent of Ti of the aluminum alloys can be up to 0.15. In an embodiment, the weight percent of Ti in the aluminum alloy can be equal to or higher than about 0.03, 0.04, 0.05, 0.06, 0.07, 0.08, 0.09, 0.1, 0.11, 0.12, 0.13 or 0.14. In still another embodiment, the weight percent of Ti in the aluminum alloy can be up to about 0.03, 0.04, 0.05, 0.05, 0.06, 0.07, 0.08, 0.09, 0.1, 0.11, 0.12, 0.13 or 0.14. In yet another embodiment, the weight percent of Ti in the aluminum alloy is at least about 0.06 and, in a further embodiment, up to about 0.15.

Strontium (Sr) can also be present in the aluminum alloy and act as a Si-phase modifier. For example, the weight percent of Sr in the aluminum alloy can be equal to or higher than about 0.005, 0.006, 0.007, 0.008, 0.009, 0.01, 0.011, 0.012, 0.013, 0.014, 0.015, 0.016, 0.017, 0.018, 0.019, 0.02, 0.021, 0.022, 0.023, 0.024, 0.025, 0.026, 0.027, 0.028 or 0.029. In another example, the weight percent of Sr in the aluminum alloy can be up to about 0.03, 0.029, 0.028, 0.027, 0.026, 0.025, 0.024, 0.023, 0.022, 0.021, 0.02, 0.019, 0.018, 0.017, 0.016, 0.015, 0.014, 0.013, 0.012, 0.011, 0.1, 0.009, 0.008, 0.007, 0.006 or 0.005. In a further embodiment, the weight percent of Sr in the aluminum alloy can be between a value of equal to or higher than about 0.005, 0.006, 0.007, 0.008, 0.009, 0.01, 0.011, 0.012, 0.013, 0.014, 0.015, 0.016, 0.017, 0.018, 0.019, 0.02, 0.021, 0.022, 0.023, 0.024, 0.025, 0.026, 0.027, 0.028 or 0.029 and a value of up to about 0.03, 0.029, 0.028, 0.027, 0.026, 0.025, 0.024, 0.023, 0.022, 0.021, 0.02, 0.019, 0.018, 0.017, 0.016, 0.015, 0.014, 0.013, 0.012, 0.011, 0.1, 0.009, 0.008 or 0.007. In an embodiment, the weight percent of Sr in the aluminum alloy is between about 0.005 to about 0.03 and, in a further embodiment, between about 0.005 and about 0.02.

As indicated above, manganese (Mn) is provided as a deliberate addition to the aluminum alloy of the present disclosure. As shown herein, the addition of Mn increases at least one tensile property of an aluminum product containing same when compared to a corresponding aluminum product lacking Mn. As used in the context of the present disclosure, tensile properties refers both to the strength of an aluminum product (e.g., ultimate tensile strength and yield strength) as well as to the elongation properties of the aluminum product. In an embodiment, the tensile property that is increased by the addition of Mn is yield strength. Without wishing to be bound to theory, the addition of Mn limits the formation of Al—Fe—Si—Mg phases or constituents (which are known to be detrimental to the tensile properties of aluminum alloys) and favors the formation of Al—Fe—Si—Mn phases. The weight percent of Mn in the aluminum alloy of the present disclosure can be equal to or higher than about 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38 or 0.39. The weight percent of Mn in the aluminum alloy of the present disclosure can be equal to or lower than about 0.4, 0.39, 0.38, 0.37, 0.36, 0.35, 0.34, 0.33, 0.32, 0.31, 0.3, 0.29, 0.28, 0.27, 0.26, 0.25, 0.24, 0.23, 0.22, 0.21, 0.22, 0.2, 0.19, 0.18, 0.17, 0.16, 0.15, 0.14, 0.13, 0.12, 0.11, 0.1, 0.09, 0.08, 0.07 or 0.06. In still another embodiment, the weight percent of Mn in the aluminum alloy is between a value of about 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38 or 0.39 and a value of about 0.4, 0.39, 0.38, 0.37, 0.36, 0.35, 0.34, 0.33, 0.32, 0.31, 0.3, 0.29, 0.28, 0.27, 0.26, 0.25, 0.24, 0.23, 0.22, 0.21, 0.22, 0.2, 0.19, 0.18, 0.17, 0.16, 0.15, 0.14, 0.13, 0.12, 0.11, 0.1, 0.09, 0.08, 0.07 or 0.06. In an embodiment, the weight percent of Mn in the aluminum alloy is between about 0.15 and 0.30. In still another embodiment, the weight percent of Mn in the aluminum alloy is of about 0.12. In yet another embodiment, the weight percent of Mn in the aluminum alloy is of about 0.25.

In an embodiment, the aluminum alloy can optionally include lanthanum (La) as a grain refiner. The weight percent of La in the aluminum alloys of the present disclosure can be equal to or lower than (e.g., up to) about 0.2, 0.19, 0.18, 0.17, 0.16, 0.15, 0.14, 0.13, 0.12, 0.11, 0.1, 0.09, 0.08, 0.07 or 0.06. In an embodiment, the weight percent of La in the aluminum alloy is lower than about 0.2, 0.19, 0.18, 0.17, 0.16, 0.15, 0.14, 0.13, 0.12, 0.11, 0.1, 0.09, 0.08, 0.07 or 0.06. In yet another embodiment, the weight percent of La is in the aluminum alloy is lower than about 0.2 and, in a further embodiment, equal to or lower than about 0.1.

In still another embodiment, the aluminum alloy can optionally comprises chromium (Cr). The weight percent of Cr in the aluminum alloys of the present disclosure can be equal to or lower than (e.g., up to) about 0.25, 0.24, 0.23, 0.22, 0.21, 0.2, 0.19, 0.18, 0.17, 0.16, 0.15, 0.14, 0.13, 0.12, 0.11, 0.1, 0.09, 0.08, 0.07 or 0.06. In an embodiment, the weight percent of Cr in the aluminum alloy is lower than (e.g., up to) about 0.25, 0.24, 0.23, 0.22, 0.21, 0.2, 0.19, 0.18, 0.17, 0.16, 0.15, 0.14, 0.13, 0.12, 0.11, 0.1, 0.09, 0.08, 0.07 or 0.06. In yet another embodiment, the weight percent of Cr is in the aluminum alloy is up to about 0.25.

The balance of the aluminum alloys of the present disclosure is aluminum (Al) and unavoidable impurities. In an embodiment, each impurity is present, in weight percent, at a maximum of about 0.05 and the total unavoidable impurities is present, in weight percent, at less than about 0.15.

In an embodiment, the aluminum alloys of the present disclosure does not include a deliberate addition of cobalt (Co). In this embodiment, when present in the aluminum alloy, Co is considered to be an impurity.

The present disclosure also provide ingots comprising the aluminum alloy described herein. The ingots made from cast alloys (such as foundry ingots or ingot Ts) can be cast.

The present disclosure also provides a process for improving at least one tensile property (such as yield strength) of an aluminum product when compared to a corresponding aluminum product. In the process, the aluminum product is made from or comprises a modified aluminum alloy (comprising Mn as a deliberate addition) whereas the corresponding aluminum product is made from or comprises a first aluminum alloy (lacking Mn as a deliberate addition). The process comprises adding Mn (at the weight percent described above) to a first aluminum alloy (comprising Si, Mg, Fe and optionally Ti and/or Sr, each at the weight percent described above) to provide the modified aluminum alloy (comprising Si, Mg, Fe, Mn and optionally Ti and/or Sr, each at the weight percent described above). An aluminum product obtained by the process described herewith is made from or comprises the modified aluminum alloy and exhibits at least one improved tensile property (such as yield strength) when compared to a corresponding aluminum product made from or comprising the first aluminum alloy. In the context of the present disclosure, the term "aluminum product" can refer to a final cast product or to an intermediary ingot which can further be worked into a differently shaped aluminum product. As such, the process can further comprise casting (such as, for example, permanent mold casting) the modified aluminum alloy in the aluminum product. In the embodiments in which the aluminum product is a cast product, the latter can be an automotive part, such as a wheel. The present disclosure also contemplates providing a process for making cast products having a minimal thickness of about 6, 7, 8, 9, 10, 11, 12, 13, 14, 15, 16, 17, 18, 19, 20, 21, 22, 23 or 24 mm. In still another embodiment, the cast product can have multiple different thicknesses (for example, two, three or four different thickness). In a further embodiment, the cast product has a first thickness of at least (and in an embodiment, no more than) 6 mm, a second thickness of at least (and in an embodiment, no more than) 12 mm and a third thickness of at least (and in an embodiment, no more than) 24 mm. The present disclosure also provides an aluminum product obtainable or obtained by the process described herewith.

The present disclosure also provides a process for making an aluminum product having an improved tensile property (such as an improved yield strength) when compared to a corresponding aluminum product lacking a deliberate addition of Mn. The process comprises working the aluminum alloy or the modified aluminum alloy described herewith or the ingot described herewith in the aluminum product. The working step can include casting (for example permanent mold casting) the aluminum alloy directly into a cast product or intermediary ingots. As such, in the context of the present disclosure, the term "aluminum product" can refer to a final cast product or to an intermediary ingot which can further be worked into a differently shaped aluminum product. In embodiments in which aluminum product is a cast product, the process can also include a post-cast heat treatment, such as, for example, a T6 treatment (e.g., solution heat treatment and artificial aging steps). In the embodiments in which the aluminum product is a cast product, the latter can be an automotive part, such as a wheel. The present disclosure also contemplates providing a process for making cast products having a minimal thickness of about 6, 7, 8, 9, 10, 11, 12, 13, 14, 15, 16, 17, 18, 19, 20, 21, 22, 23 or 24 mm. In still another embodiment, the cast product can have multiple different thicknesses (for example, two, three or four different thickness). In a further embodiment, the cast product has a first thickness of at least (and in an embodiment, no more than) 6 mm, a second thickness of at least (and in an embodiment, no more than) 12 mm and a third thickness of at least (and in an embodiment, no more than) 24 mm. The present disclosure also provides an aluminum product obtainable or obtained by the process described herewith.

The present invention will be more readily understood by referring to the following examples which are given to illustrate the invention rather than to limit its scope.

EXAMPLE I

Mn Addition to A357 Alloys

A base alloy A357 was supplemented with Mn, optionally in combination with La. The tensile and metallographic properties of the resulting alloys were determined.

Tensile bars comprising one of the alloys whose chemistry is presented in Table 1 was produced in an electrical resistance furnace. Mn (~0.27 weight percentage (wt %)) and pure La (0.1 wt % and 0.2 wt %) were added into the melt at 750° C.±5° C., respectively. The melt was degassed using a rotary graphite impeller degasser rotating at 300 rpm for about 20 min. Sr was added to the degassed melt prior to pouring. The surface of the melt was skimmed, and then the melt was poured into the permanent mold (preheated at 400° C.±5° C.) at 720° C.±5° C. Samplings for chemical analysis were also taken to confirm the composition of the alloys during casting. All samples were solution heat treated at 540° C., for 4 hours, followed by a warm water quench at 50° C. A floor age, between 12 to 24 hours, at room temperature, was performed between quenching and artificial aging. Finally, the samples underwent an aging cycle at 160° C. for 6 hours.

To evaluate the effect of the additions of Mn and La in the T6-treated condition on the ultimate tensile strength (UTS) and yield strength (YS), the tensile tests were carried out using the INSTRON® universal testing machine. In each case, ten tensile tests were carried out, and the averages of results were provided. The chemical compositions and tensile results, from the different alloys are summarized in Table 1.

TABLE 1

Chemical compositions and strength properties of the alloys of Example I. Elemental composition is provided in weight percentages for all elements, except for Sr which is presented as ppm. The ultimate tensile strength (UTS) and yield strength (YS) values are provided in MPa.

| | Element (wt %) | | | | | | | | | | |
|---|---|---|---|---|---|---|---|---|---|---|---|
| Alloy Code | Si | Fe | Cu | Mn | Mg | Ti | Sr | La | Al | UTS (MPa) | YS (MPa) |
| A357 | 7.20 | 0.11 | 0.01 | — | 0.47 | 0.09 | 120 ppm | — | Bal. | 325.38 | 255.04 |
| A357-Mn | 7.20 | 0.12 | 0.01 | 0.26 | 0.47 | 0.09 | 155 ppm | — | Bal. | 327.82 | 264.68 |

TABLE 1-continued

Chemical compositions and strength properties of the alloys of Example I. Elemental composition is provided in weight percentages for all elements, except for Sr which is presented as ppm. The ultimate tensile strength (UTS) and yield strength (YS) values are provided in MPa.

| Alloy Code | Element (wt %) | | | | | | | | | UTS (MPa) | YS (MPa) |
|---|---|---|---|---|---|---|---|---|---|---|---|
| | Si | Fe | Cu | Mn | Mg | Ti | Sr | La | Al | | |
| A357-Mn—0.1La | 7.35 | 0.12 | 0.01 | 0.27 | 0.48 | 0.09 | 155 ppm | 0.1 | Bal. | 326.33 | 259.37 |
| A357-Mn—0.2La | 7.30 | 0.12 | 0.01 | 0.27 | 0.46 | 0.09 | 160 ppm | 0.2 | Bal. | 312.69 | 251.24 |

As can be seen from Table 1, the base alloy A357 had 325 MPa of UTS and 255 MPa of YS. The ultimate tensile strength did not exhibit any significant differences in the other alloys when Mn was added. However, the yield strength of alloys containing additions of Mn was increased when compared to the base alloy A357. Table 1 shows that both UTS and YS decreased as the La content was increased from 0.1 to 0.2.

The estimated grain sizes of the chemistries of Table 1 are shown in FIG. 1. The estimated average grain size for alloys A357, A357-Mn, A357-Mn-0.1La and A357-Mn-0.2La are 400 μm, 450 μm, 260 μm and 315 μm, respectively. In these experimental conditions, the addition of Mn into alloy A357 increased the grain size by 50 μm. Still in these experimental conditions, the addition of 0.1 La refined the grain structure of alloy A357 containing Mn and presenting a reduction of grain size from 450 to 260 μm, respectively whereas the addition of 0.2 La had a limited effect in grain refinement and even increased the grain size compared with alloy A357-Mn-0.1La.

EXAMPLE II

Effects of Mg Weight Percent on Strength

Alloys comprising either 6.0 Si and 0.12 Fe (herewith designated as "−Mn/−Cr") or 6.0 Si, 0.12 Fe, 0.12 Mn, 0.12 Cr (herewith designated as "+Mn/+Cr") were supplemented with Mg, at a weight percent varying between 0.35 and 0.70. The alloys were submitted to a T6 treatment prior to determining their tensile properties.

Figure 2:
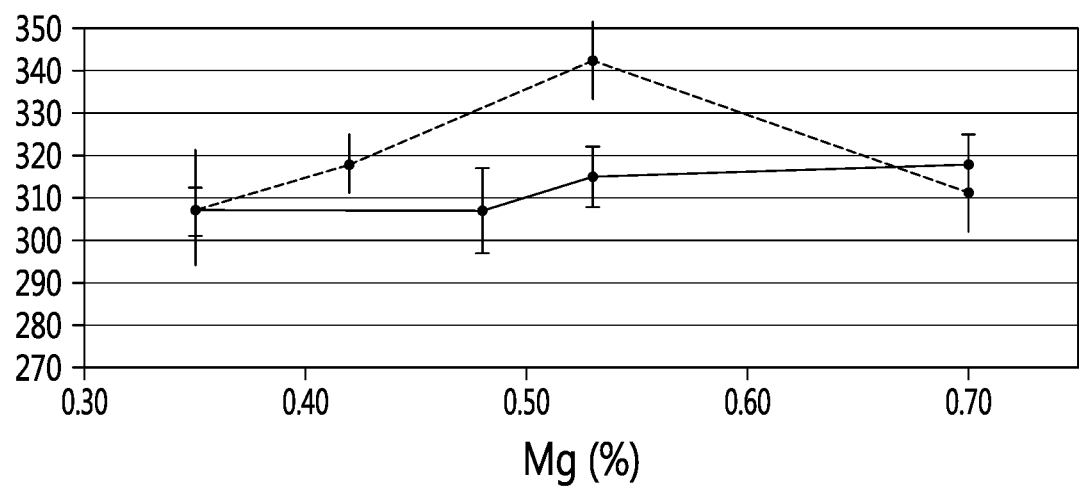
FIG. 2 illustrates the effect of the chemistry of the different alloys on ultimate tensile strength. Results are shown as the ultimate tensile strength (in MPa) in function of the weight percent of Mg for alloys comprising Mn and Cr (+Mn/+Cr; dashed line) as well as for alloys that do not include a deliberate addition of Mn and Cr (−Mn/−Cr; black line).
Figure 3:
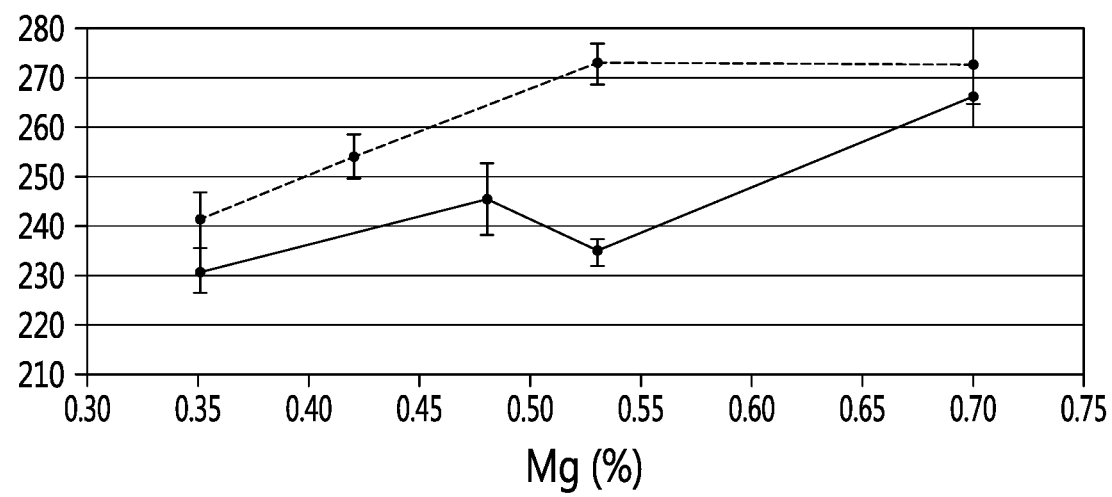
FIG. 3 illustrates the effect of the chemistry of the different alloys on yield tensile strength. Results are shown as the yield tensile strength (in MPa) in function of the weight percent of Mg for alloys comprising Mn and Cr (+Mn/+Cr; dashed line) as well as for alloys that do not include a deliberate addition of Mn and Cr (−Mn/−Cr; black line).
Figure 4A:
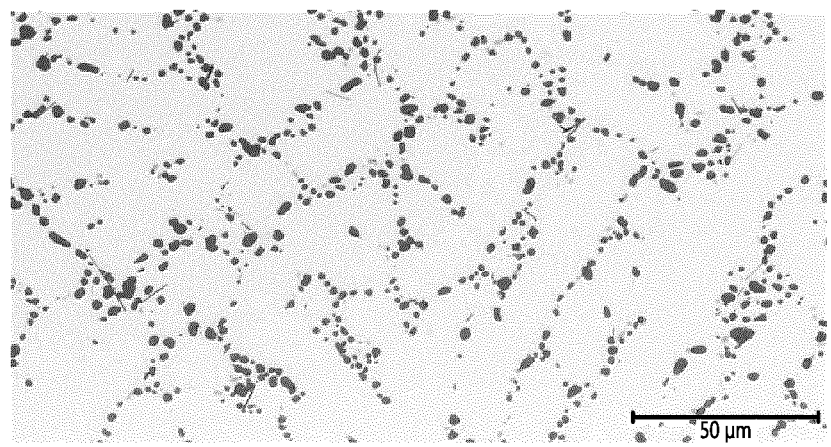
FIG. 4A to S provide the microstructurel features of the alloys of Example III. Results are shown for Alloy C-1 aged for 2 hours at 160° C. and cast at a thickness of 6 mm (A), 12 mm (B) or 24 mm (C); Alloy C-1 aged for 4 hours at 160° C. and cast at a thickness of 6 mm (D), 12 mm (E) or 24 mm (F); Alloy C-1 aged for 6 hours at 160° C. and cast at a thickness of 6 mm (G), 12 mm (H) or 24 mm (I); Alloy C-2 aged for 2 hours at 160° C. and cast at a thickness of 6 mm (J), 12 mm (K) or 24 mm (L); Alloy C-2 aged for 4 hours at 160° C. and cast at a thickness of 6 mm (M), 12 mm (N) or 24 mm (O); Alloy C-2 aged for 6 hours at 160° C. and cast at a thickness of 6 mm (P), 12 mm (Q) or 24 mm (R and S). Scale bar=50 μm. In Figures (F) and (S), the arrows point to Al—Fe—Si—Mn phases.
Figure 4B:
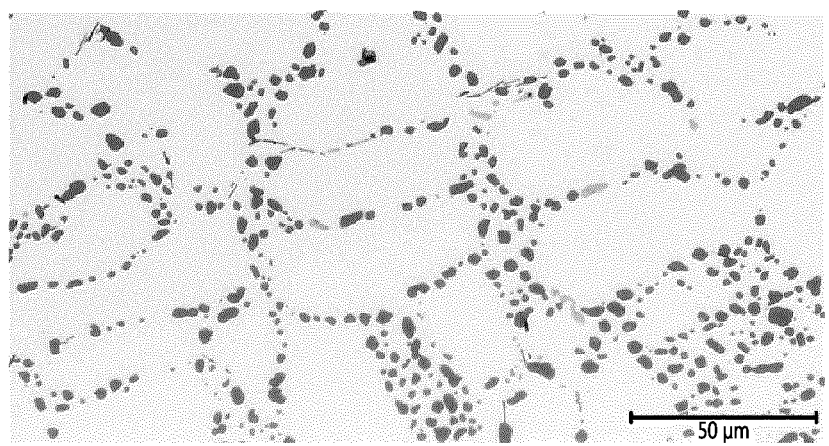
Figure 4C:
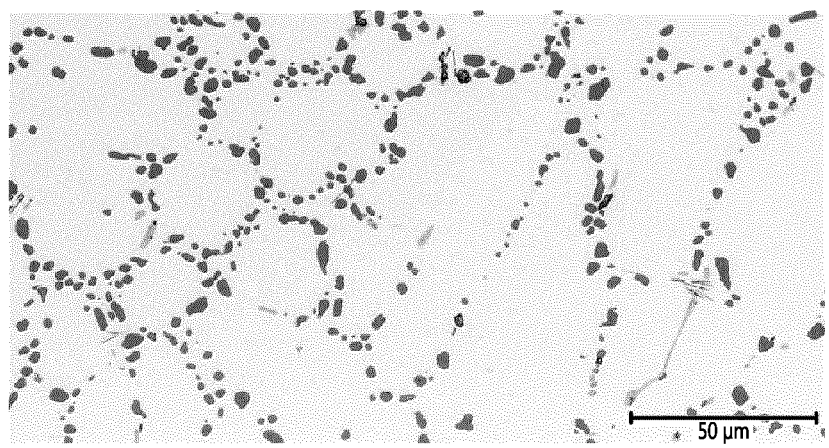
Figure 4D:
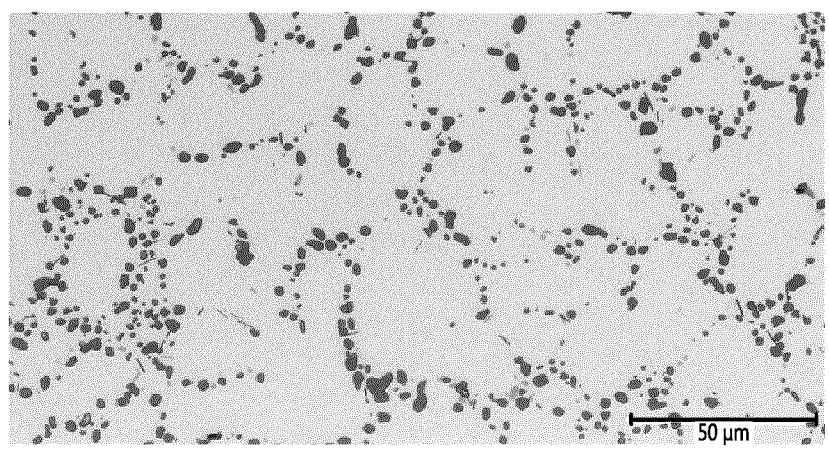
Figure 4E:
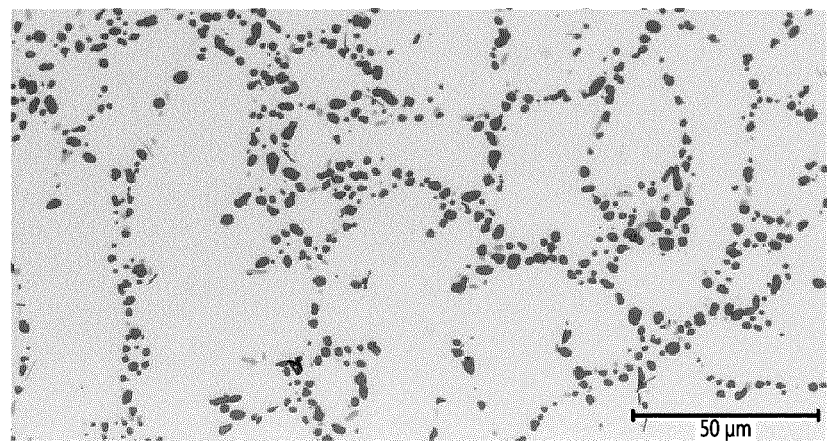
Figure 4F:
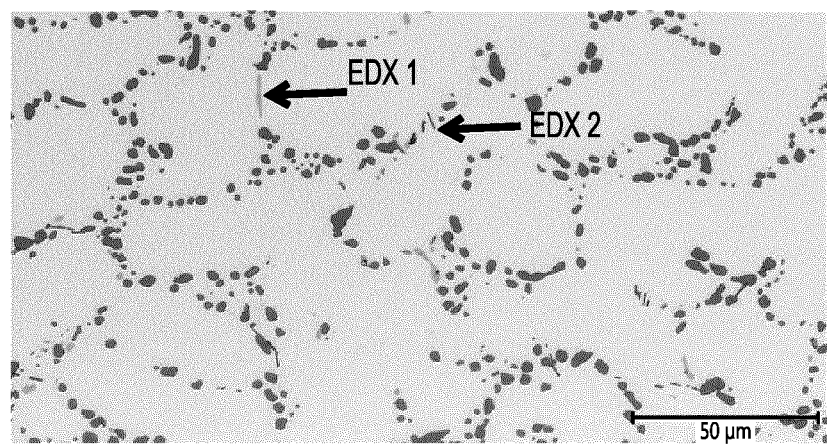
Figure 4G:
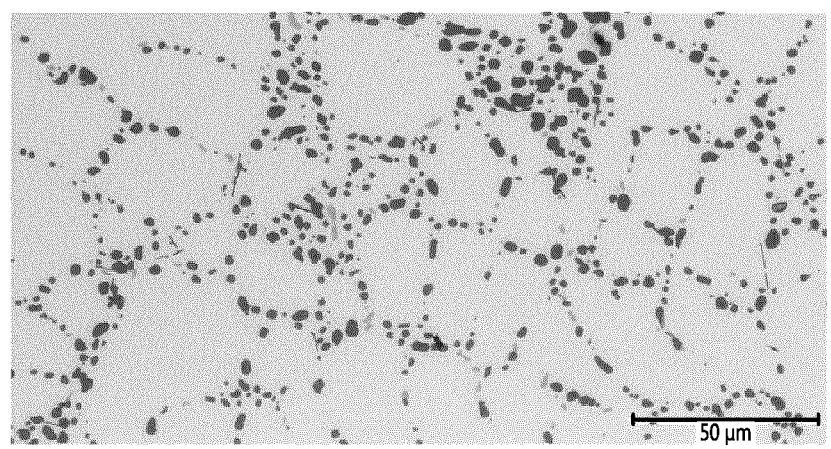
Figure 4H:
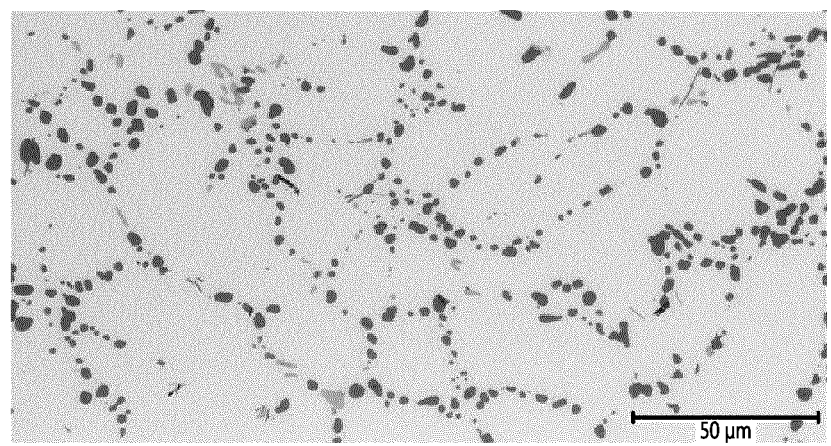
Figure 4I:
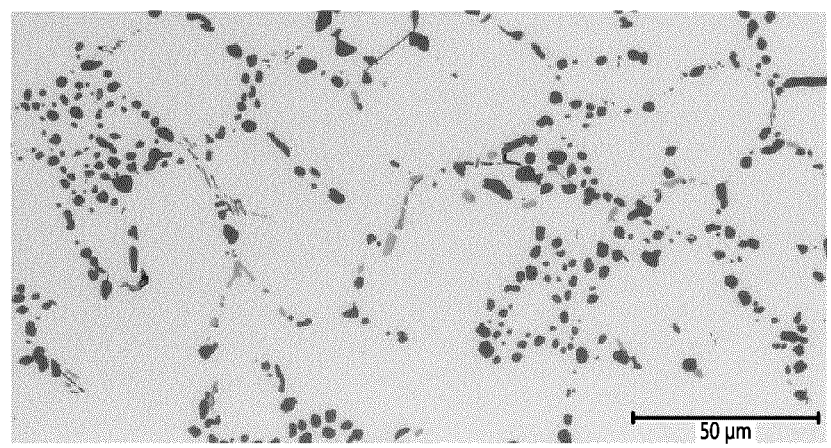
Figure 4J:
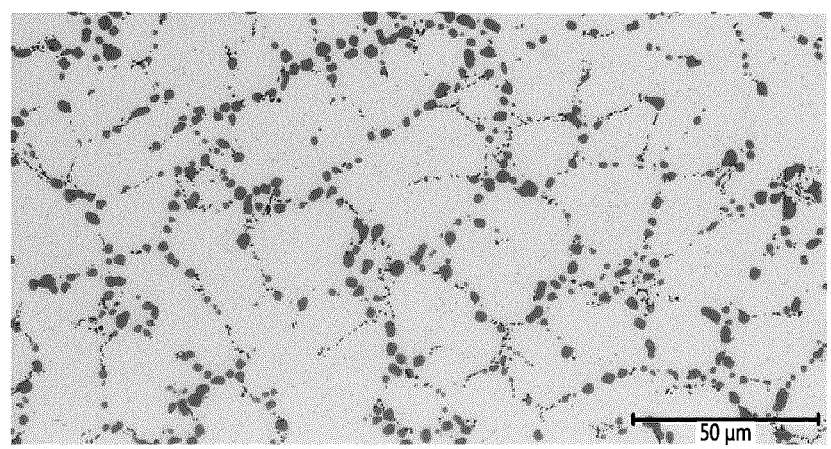
Figure 4K:
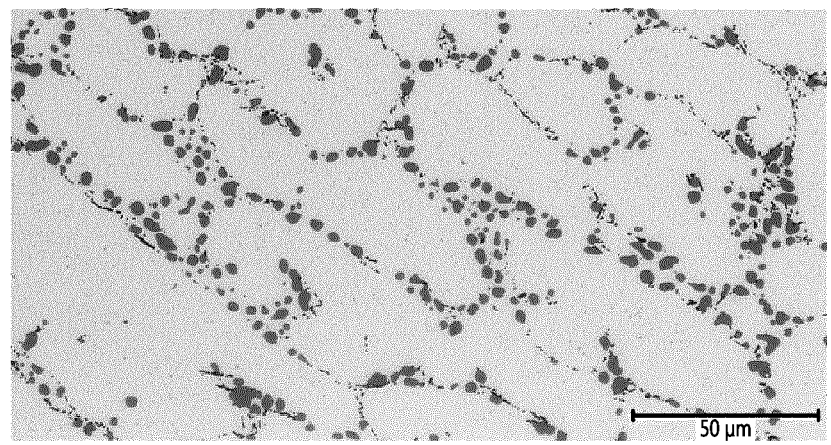
Figure 4L:
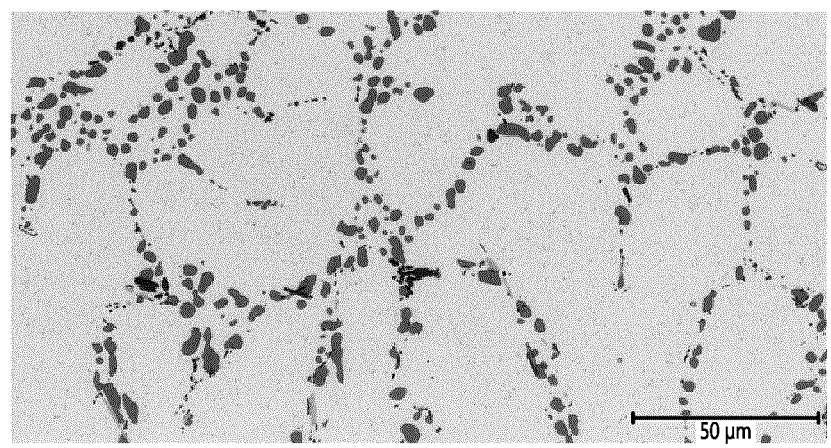
Figure 4M:
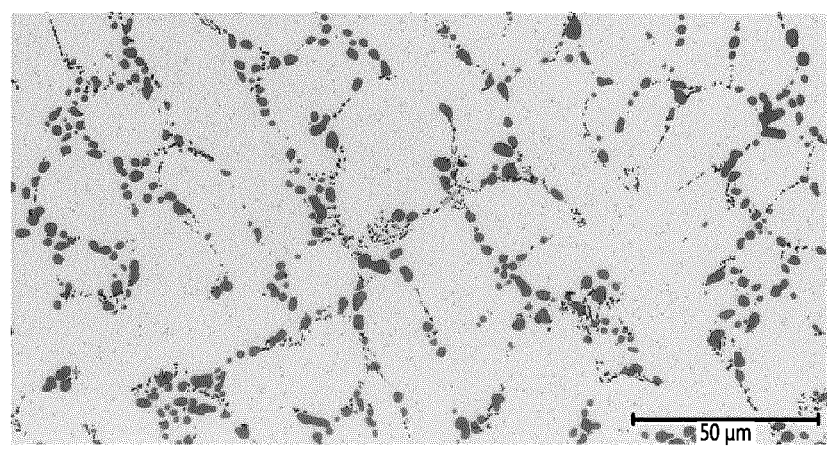
Figure 4N:
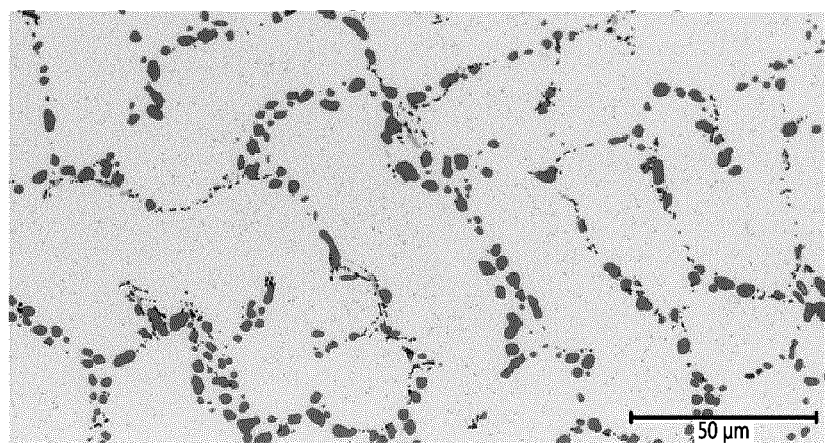
Figure 4O:
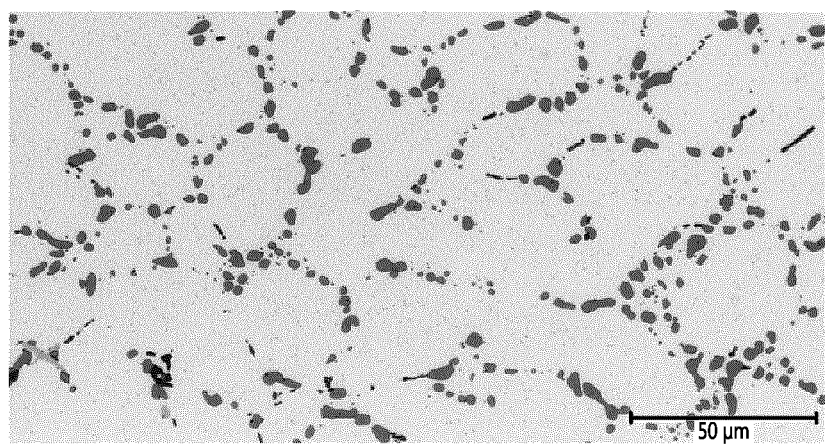
Figure 4P:
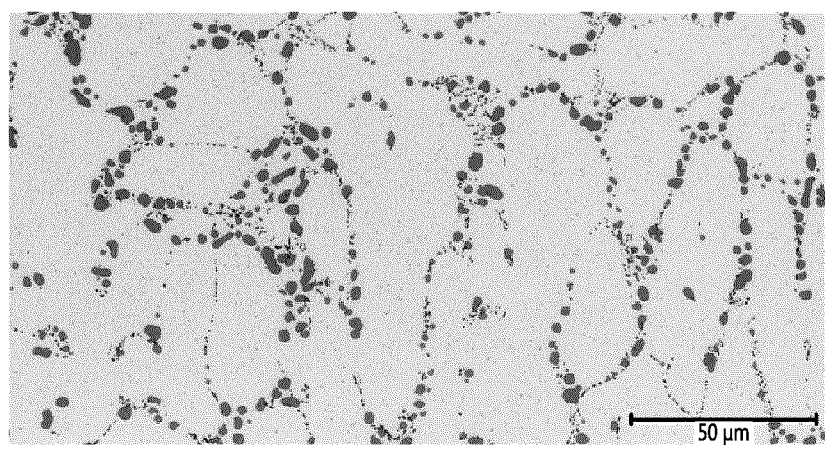
Figure 4Q:
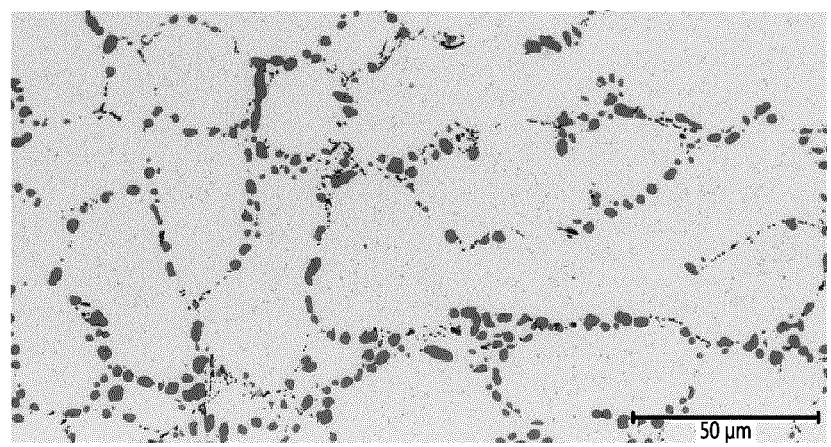
Figure 4R:
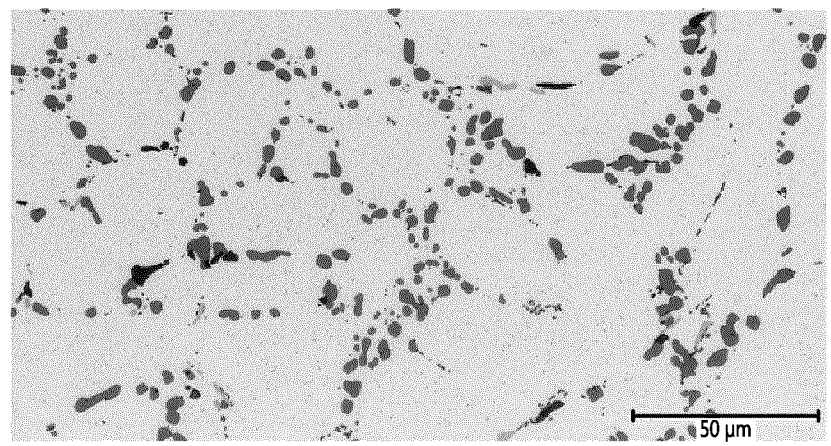
Figure 4S:
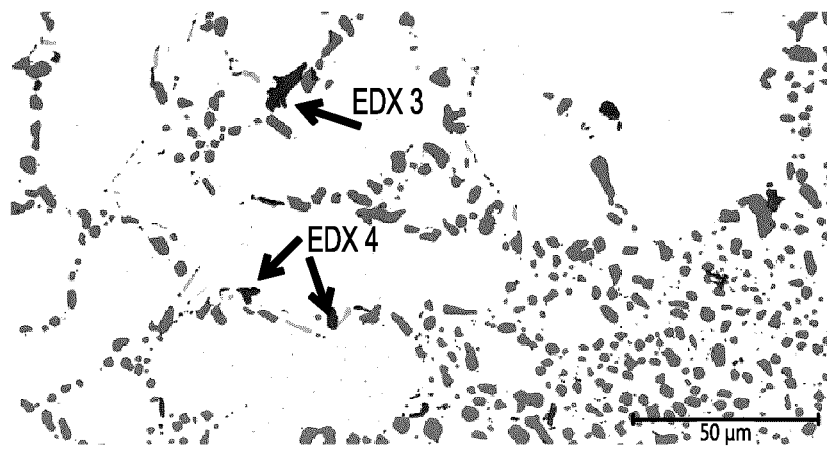

The addition of Mn and Cr did maintain or increase the ultimate tensile strength, when compared to corresponding alloys that did not include Mn or Cr (FIG. 2). The addition of Mn and Cr did increase the yield strength, when compared to corresponding alloys that did not include Mn or Cr (FIG. 3). The addition of Mn only (e.g., the omission of Cr) provided similar results (increase in yield tensile strength, no significant change on ultimate tensile strength, Example III and data not shown).

EXAMPLE III

Effect of Thermal Treatment on Tensile Properties and Microstructure

Alloys lacking Mn (Al7Si0Mn) or comprising Mn (Al7Si0.25Mn) were made. The elemental composition of each tested alloy is presented in Table 2.

TABLE 2

Elemental composition of the alloys tested in Example III, provided in weight percent.

| | Designation | | | | | |
|---|---|---|---|---|---|---|
| | Al7Si0Mn | | | Al7Si0.25Mn | | |
| | Sample | | | | | |
| | CI-1 | CI-2 | CI-3 | CII-1 | CII-2 | CII-3 |
| Si | 6.88 | 6.97 | 6.99 | 6.77 | 6.85 | 6.84 |
| Fe | 0.119 | 0.118 | 0.118 | 0.146 | 0.147 | 0.146 |
| Cu | 0.003 | 0.003 | 0.004 | 0.002 | 0.002 | 0.002 |
| Mn | 0.01 | 0.01 | 0.01 | 0.27 | 0.27 | 0.26 |
| Mg | 0.48 | 0.48 | 0.48 | 0.48 | 0.51 | 0.50 |
| Cr | 0.001 | 0.001 | 0.001 | 0.001 | 0.001 | 0.001 |
| Ni | 0.011 | 0.011 | 0.011 | 0.011 | 0.011 | 0.011 |
| Zn | 0.030 | 0.030 | 0.030 | 0.028 | 0.028 | 0.028 |
| Ti | 0.11 | 0.11 | 0.11 | 0.10 | 0.10 | 0.10 |
| Ca | 0.0001 | 0.0002 | 0.0002 | 0.0001 | 0.0001 | 0.0001 |
| Co | 0.0001 | 0.0001 | 0.0001 | 0.0001 | 0.0002 | 0.0002 |
| Ga | 0.006 | 0.006 | 0.006 | 0.006 | 0.006 | 0.006 |
| Li | 0.0000 | 0.0000 | 0.0000 | 0.0000 | 0.0000 | 0.0000 |
| Na | 0.0000 | 0.0000 | 0.0000 | 0.0000 | 0.0000 | 0.0000 |
| P | 0.0004 | 0.0005 | 0.0004 | 0.0004 | 0.0004 | 0.0005 |
| Sr | 0.0002 | 0.0111 | 0.0112 | 0.0000 | 0.0114 | 0.0069 |
| V | 0.014 | 0.014 | 0.014 | 0.014 | 0.014 | 0.014 |
| Zr | 0.0008 | 0.0010 | 0.0009 | 0.0010 | 0.0010 | 0.0010 |

The alloys were cast on a low pressure machine using a step mold (6, 12 or 25 mm) and then submitted to a T6 treatment step (aging step conducted at a temperature of 160° C. or 190° C. for 2, 4, 5 or 6 hours, see Table 3). The tensile properties of the resulting cast products (n=12) are shown in Table 3.

TABLE 3

Mean plate thickness (in mm), aging step characteristics (temperature in Celsius and duration in hours) of alloys lacking (Al7Si0Mn) or comprising (Al7Si0.25Mn) Mn.

| Thick-ness mm | Aging Temperature ° C. | Dura-tion h | Al7Si0Mn | | | Al7Si0.25Mn | | |
|---|---|---|---|---|---|---|---|---|
| | | | UTS MPa | YS MPa | QI MPa | UTS MPa | YS MPa | QI MPa |
| 6 | 160 | 2 | 287 | 198 | 417 | 300 | 208 | 430 |
| 6 | 160 | 4 | 313 | 233 | 443 | 316 | 235 | 444 |
| 6 | 160 | 6 | 323 | 251 | 447 | 331 | 267 | 436 |
| 6 | 190 | 4 | — | — | — | 345 | 307 | 427 |
| 6 | 190 | 5 | 319 | 278 | 412 | — | — | — |
| 12 | 160 | 2 | 273 | 198 | 384 | 274 | 196 | 384 |
| 12 | 160 | 4 | 306 | 232 | 423 | 308 | 242 | 420 |
| 12 | 160 | 6 | 314 | 247 | 435 | 319 | 259 | 417 |
| 12 | 190 | 4 | — | — | — | 330 | 301 | 368 |
| 12 | 190 | 5 | 302 | 276 | 337 | — | — | — |
| 25 | 160 | 2 | 277 | 191 | 405 | 273 | 194 | 379 |

TABLE 3-continued

Mean plate thickness (in mm), aging step characteristics (temperature in Celsius and duration in hours) of alloys lacking (Al7Si0Mn) or comprising (Al7Si0.25Mn) Mn.

| Thick-ness mm | Aging Temperature °C. | Dura-tion h | Al7Si0Mn | | | Al7Si0.25Mn | | |
|---|---|---|---|---|---|---|---|---|
| | | | UTS MPa | YS MPa | QI MPa | UTS MPa | YS MPa | QI MPa |
| 25 | 160 | 4 | 291 | 225 | 397 | 294 | 233 | 379 |
| 25 | 160 | 6 | 303 | 242 | 402 | 299 | 252 | 359 |
| 25 | 190 | 4 | — | — | — | 326 | 297 | 357 |
| 25 | 190 | 5 | 306 | 269 | 375 | — | — | — |

UTS = ultimate tensile strength (in MPa), YS = yield strength (in MPa), QI = quality index (in MPa).

As shown on Table 3, when the product is aged at a temperature of 160° C. for 4 h and cast into a product that has a 12 mm thickness, the alloy comprising Mn exhibited a yield strength 10 MPa higher than the corresponding alloy lacking Mn and 30-40 MPa higher than the reference A356 alloy (data not shown).

The percentage of the different microstructurel phases of the resulting cast products were then determined. These results are shown in FIG. 4 and Table 4.

TABLE 4

Approximated percentage of each constituents in cast plates, in function of the thickness (6, 12 or 24 mm) and T6 treatment characteristics (aging step conducted at 160° C. for 2, 4 or 6 hours) of each cast plates products.

| | | Al—Si—Fe[(1)] | Al—Fe—Si—Mg[(2)] | Al—Fe—Si—Mn[(3)] | Al—Fe—Si—Mn[(4)] |
|---|---|---|---|---|---|
| C-1 160 2 h | 6 mm | 90% | 10% | | |
| | 12 mm | 70% | 30 | | |
| | 24 mm | 50% | 50 | | |
| C-1 160 4 h | 6 mm | 85% | 15% | | |
| | 12 mm | 80% | 20% | | |
| | 24 mm | 60% | 40% | | |
| C-1 160 6 h | 6 mm | 55% | 45% | | |
| | 12 mm | 45% | 55% | | |
| | 24 mm | 40% | 60% | | |
| C-2 160 2 h | 6 mm | | <1% | <1% | 100% |
| | 12 mm | | <1% | <1% | 100% |
| | 24 mm | | 1% | <1% | 99% |
| C-2 160 4 h | 6 mm | | <1% | <1% | 100% |
| | 12 mm | | <1% | <1% | 100% |
| | 24 mm | | 1% | 1% | 98% |
| C-2 160 6 h | 6 mm | | <1% | <1% | 100% |
| | 12 mm | | <1% | <1% | 100% |
| | 24 mm | | <1% | 20% | 80% |

[(1)]Needle-like phase blackened by the HF 0.5% attack
[(2)]Round platelet-like phase that have not reacted with HF 0.5%
[(3)]Script-like phase browned by the HF 0.5% attack
[(4)]Small platelet-like phase blackened by the HF 0.5% attack As shown in Table 4, the presence of Mn limits the formation of Al—Fe—Si—Mg and favors the formation of Al—Si—Fe—Mn instead. This effect on microstructure is even maintained on the cast product for all cast thicknesses. In the absence of Mn, the Al—Fe—Si—Mg phase concentration worsens with the thickness of the cast product. In the presence of Mn, the thickness of the cast product is not associated with a worsening of the Al—Fe—Si—Mg phase concentration.

While the invention has been described in connection with specific embodiments thereof, it will be understood that the scope of the claims should not be limited by the preferred embodiments set forth in the examples, but should be given the broadest interpretation consistent with the description as a whole.

What is claimed is:

1. An aluminum alloy consisting of, in weight percent:
between 5 and 9 of Si;
between 0.45 and 0.6 of Mg;
between higher than 0.10 and equal to or lower than 0.30 of Mn;
lower than 0.15 of Fe;
up to 0.15 of Ti;
between 0.005 and 0.03 of Sr;
between 0 and 0.2 of La;
between 0 and 0.25 of Cr; and
the balance being aluminum and unavoidable impurities, wherein the unavoidable impurities are present in an amount of between 0 and 0.05 each and between 0 and 0.15 total.

2. The aluminum alloy of claim 1, wherein the weight percent of Si is between 6 and 8.

3. The aluminum alloy of claim 1, wherein the weight percent of Fe is lower than 0.12.

4. The aluminum alloy of claim 1, wherein the weight percent of Fe is between 0.1 and 0.15.

5. The aluminum alloy of claim 1, wherein the weight percent of Ti is between 0.06 and 0.15.

6. The aluminum alloy of claim 1, wherein the weight percent of Sr is between 0.005 and 0.02.

7. A foundry ingot comprising the aluminum alloy of claim 1.

8. A process for making an aluminum product, the process comprising working an aluminum alloy in the aluminum product, wherein the aluminum alloy consists of, in weight percent:
between 5 and 9 of Si;
between 0.45 and 0.6 of Mg;
between higher than 0.10 and equal to or lower than 0.30 of Mn;
lower than 0.15 of Fe;
up to 0.15 of Ti;
between 0.005 and 0.03 of Sr;
between 0 and 0.2 of La;
between 0 and 0.25 of Cr; and the balance being aluminum and unavoidable impurities, wherein the unavoidable impurities are present in an amount of between 0 and 0.05 each and between 0 and 0.15 total.

9. The process of claim 8, wherein the aluminum product is a cast product and the process further comprises casting the aluminum alloy into the cast product.

10. The process of claim 9, wherein the casting comprises permanent mold casting.

\* \* \* \* \*